US010671795B2

(12) United States Patent
Perrin et al.

(10) Patent No.: US 10,671,795 B2
(45) Date of Patent: Jun. 2, 2020

(54) HANDWRITING PREVIEW WINDOW

(71) Applicant: Lenovo (Singapore) Pte. Ltd., Singapore (SG)

(72) Inventors: Steven Richard Perrin, Raleigh, NC (US); Jianbang Zhang, Cary, NC (US); Russell Speight VanBlon, Raleigh, NC (US); Joshua Neil Novak, Wake Forest, NC (US); Aaron Michael Stewart, Raleigh, NC (US); Jonathan Jen-Wei Yu, Raleigh, NC (US); Sarah Jane E Cox, Raleigh, NC (US); Geoffrey Simon Bula, Apex, NC (US); Rajesh Krishna Daivajna, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 79 days.

(21) Appl. No.: 14/581,050

(22) Filed: Dec. 23, 2014

(65) Prior Publication Data
US 2016/0179758 A1 Jun. 23, 2016

(51) Int. Cl.
| G06F 17/20 | (2006.01) |
| G06F 40/106 | (2020.01) |
| G06F 3/0488 | (2013.01) |
| G06F 40/171 | (2020.01) |

(52) U.S. Cl.
CPC ........ G06F 40/106 (2020.01); G06F 3/04883 (2013.01); G06F 40/171 (2020.01)

(58) Field of Classification Search
CPC .................................................. G06F 17/242
See application file for complete search history.

(56) References Cited

U.S. PATENT DOCUMENTS

| 6,836,759 | B1 * | 12/2004 | Williamson | ............ G10L 15/22 382/181 |
| 2001/0026262 | A1 * | 10/2001 | Van Gestel | ......... G06F 3/04883 345/156 |
| 2005/0099406 | A1 * | 5/2005 | Pettiross | ............... G06F 3/0236 345/179 |
| 2006/0078866 | A1 * | 4/2006 | Marggraff | ............. G06F 3/0321 434/353 |
| 2009/0161958 | A1 * | 6/2009 | Markiewicz | .......... G06F 3/0237 382/186 |
| 2014/0108004 | A1 * | 4/2014 | Sternby | ................. G06F 17/242 704/9 |
| 2014/0363082 | A1 * | 12/2014 | Dixon | ................ G06K 9/00402 382/187 |
| 2014/0363083 | A1 * | 12/2014 | Xia | .................... G06K 9/00436 382/189 |

FOREIGN PATENT DOCUMENTS

EP 1376448 A2 * 1/2004 ............. G06K 9/222

* cited by examiner

Primary Examiner — Shahid K Khan
(74) Attorney, Agent, or Firm — Ference & Associates LLC

(57) ABSTRACT

One embodiment provides a method, including: detecting, in an overlay input application, one or more ink strokes provided to an input field overlay area; and providing, in the overlay input application, a preview area that displays a typeset preview for the one or more ink strokes; wherein the preview area is displayed in a location determined by an area associated with current ink stroke input. Other embodiments are described and claimed.

18 Claims, 5 Drawing Sheets

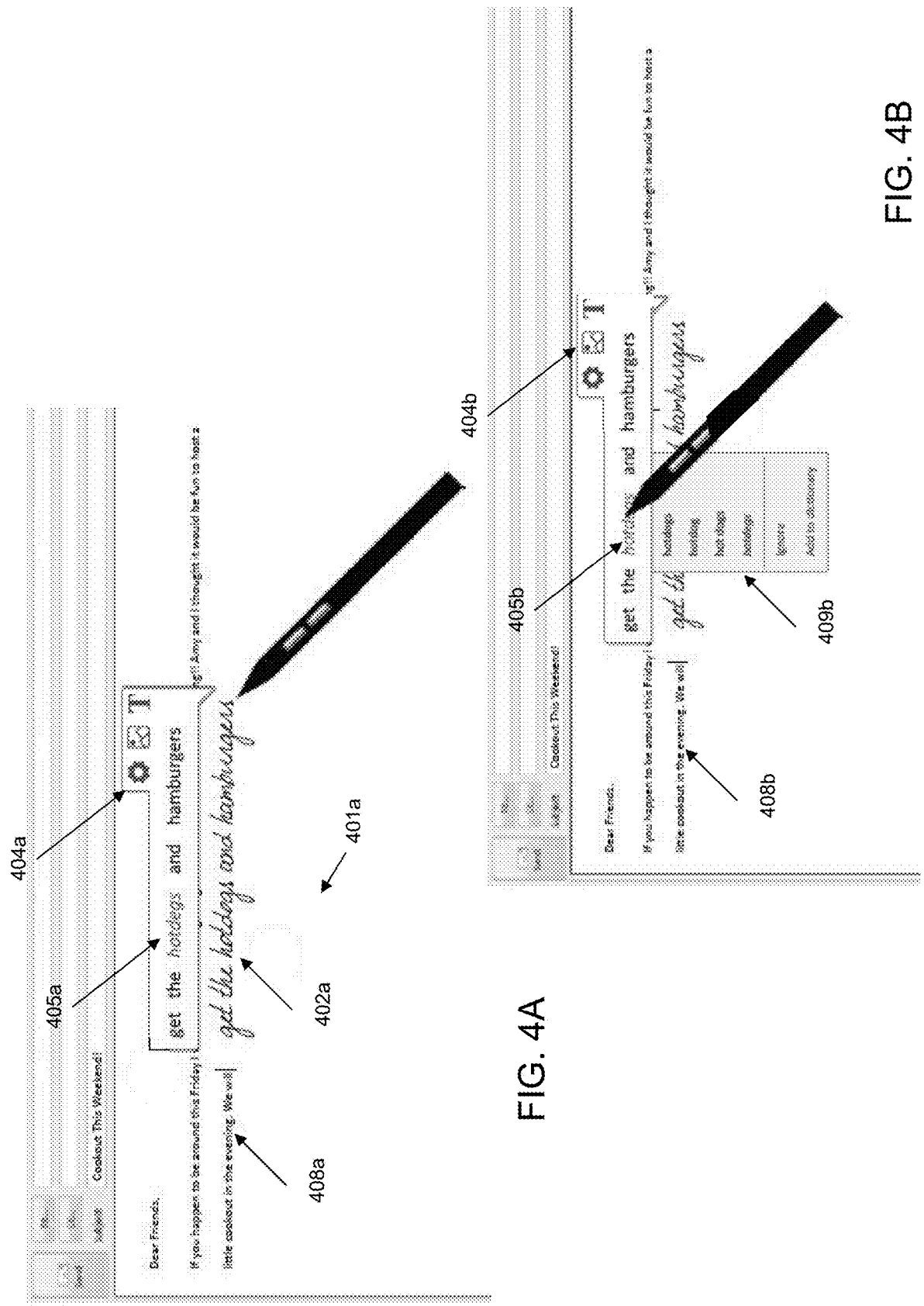

HANDWRITING PREVIEW WINDOW

BACKGROUND

Information handling devices ("devices"), for example cell phones, smart phones, tablet devices, laptop computers, and the like permit users to input handwriting using a finger or pen/stylus. This allows users to write more naturally and without the use of a keyboard.

Conventionally a handwriting field, box or pane is presented to the user as an overlay, e.g., a rectangle in a lower portion of a touch screen display. In this area the user may provide input handwriting strokes, e.g., letters, numbers, characters, symbols, etc. The device employs software that uses the input handwriting strokes, which are generally presented on screen to provide visual feedback to the user, as input by converting the handwriting stroke input locations on the touch screen into machine text according to the language setting of the device. Alternatively, a graphic or image of handwriting input may be placed into an underlying application, e.g., an image of the user's signature.

BRIEF SUMMARY

In summary, one aspect provides a method, comprising: detecting, in an overlay input application, one or more ink strokes provided to an input field overlay area; and providing, in the overlay input application, a preview area that displays a typeset preview for the one or more ink strokes; wherein the preview area is displayed in a location determined by an area associated with current ink stroke input.

Another aspect provides an electronic device, comprising: a display device; a processor operatively coupled to the display device; and a memory device that stores instructions executable by the processor to: detect, in an overlay input application, one or more ink strokes provided to an input field overlay area; and provide, in the overlay input application, a preview area that displays a typeset preview for the one or more ink strokes; wherein the preview area is displayed in a location determined by an area associated with current ink stroke input.

A further aspect provides a product, comprising: a storage device having code stored therewith, the code being executable by a processor of an electronic device and comprising: code that detects, in an overlay input application, one or more ink strokes provided to an input field overlay area; and code that provides, in the overlay input application, a preview area that displays a typeset preview for the one or more ink strokes; wherein the preview area is displayed in a location determined by an area associated with current ink stroke input.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4(A-B) illustrates example operation of a handwriting preview window.

DETAILED DESCRIPTION

Figure 1:
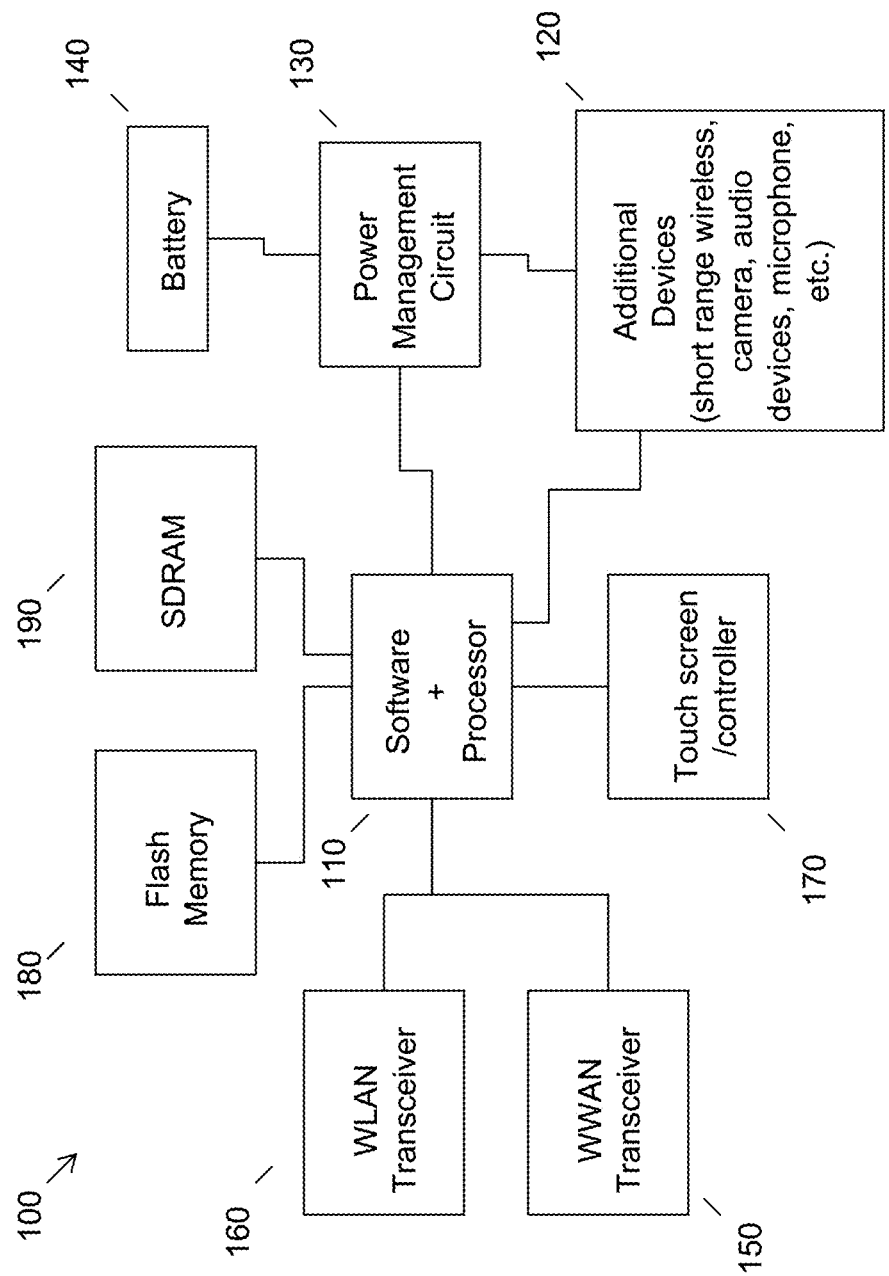
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Although conventional input method editors (IMEs) provide a user with the ability to input ink strokes (e.g., handwritten letters, numbers, or other characters), these tend provide an offset input overlay, e.g., a window or screen section presented at a different area than the underlying input field of an application. A common example is presentation of an overlay field at the lower portion of the screen for inputting ink strokes (converted to typeset) into an underlying input field (e.g., web browser search box), which itself is presented at an upper part of the screen.

Existing solutions that bring up a separate overlay field in a different location to allow the user to handwrite the text, e.g., where the on-screen soft keyboard is usually located, draw the user's attention away from the underlying application field, i.e., the location where the converted text will get inserted. This context switch can cause the user confusion and delay, e.g., if the user is trying to convert and insert a lot of handwritten ink into typeset text.

Also, use of a separate overlay or window typically involves covering a large portion of the display screen, reducing the viewable area of the active underlying application. In the overlay window, e.g., presented at the bottom of the screen, the user may see the results of handwriting recognition prior to inserting text into the application. The user then must explicitly confirm that the results are correct by pressing a button to move the handwritten input from the window to the underlying application, either as handwriting input converted to typeset or as a graphic.

Accordingly, an embodiment provides an overlay window or area that is co-located with (e.g., directly on top of) the underlying application's field(s) (and any existing typeset text). This allows a user to efficiently and intuitively enter text into an underlying application on a device, e.g., having a touch screen but lacking a physical keyboard. With a stylus or with the user's finger, the user writes text at the location where they want the text to appear.

In an embodiment, a user is able to provide handwriting ink strokes directly onto the underlying application's input field, i.e., visually where the user wants text to be inserted. As words are recognized in the handwriting, via a handwriting recognition process, the machine input words are displayed as typeset in a window directly above the handwriting location on the screen. In this window, the user can quickly confirm that the handwriting was recognized correctly. If not, the user can select from alternate recognition results.

Recognized handwriting may be moved into the underlying application's input field as text from the window automatically. For example, when N words have been identified, the first of these N words may be inserted into the underlying application and removed from the window. By way of specific example, if the preview provides five typeset words in the preview, on entry and recognition of the sixth word, the first of the five words may be moved into the underlying application. Alternatively, when the user stops writing for a period of time (and optionally moves the pen away from the screen), all words in the window is transferred to the application. As another example, when the user starts writing on a new line, e.g., identified by a return gesture or otherwise identified as a change in the position at which the user is providing handwriting, all currently recognized handwritten words in the window may be transferred to the application. Likewise, when the user starts writing in a new underlying input field, all words in the window may be transferred to the application.

If none of the above conditions is met for automating the text entry process, the user may input some or all of the words in the preview window into the underlying application, e.g., by pressing a soft button or control in the window. Alternately, the user may input some or all of the words to be inserted by drawing a predetermined gesture, e.g., a "return" gesture. When any word is inserted into the underlying application, the corresponding handwriting may be deleted. Words in the window may be aligned with their handwritten counterparts, e.g., to avoid fragmentation of the user's attention due to a visual offset. The window may include a button that overrides the automatic text insertion behavior. When this button is pressed, for example, the user's writing is inserted into the application as an image or graphic, e.g., for insertion of a user's signature at the end of an email.

Additional automated processing of the handwritten strokes may be implemented. For example, the handwriting recognition engine may detect when a user is drawing a picture (rather than writing recognizable text such as letters, numbers, or other characters that map neatly to machine typeset). In this case, the window may provide an indication that the handwritten ink strokes are not recognizing text (for example, by displaying a special symbol or set of characters, e.g., " . . . ", instead of actual words or characters). Automatic insertion may be disabled in this case. Rather, the user may insert the handwritten ink strokes (e.g., picture, signature, etc.) by using a soft control provided within the window.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included, e.g., a camera, short range wireless devices, a microphone, etc. System 100 often includes a touch screen 170 for data input and display/rendering. System 100 also typically includes various memory devices, for example flash memory 180 and SDRAM 190.

Figure 2:
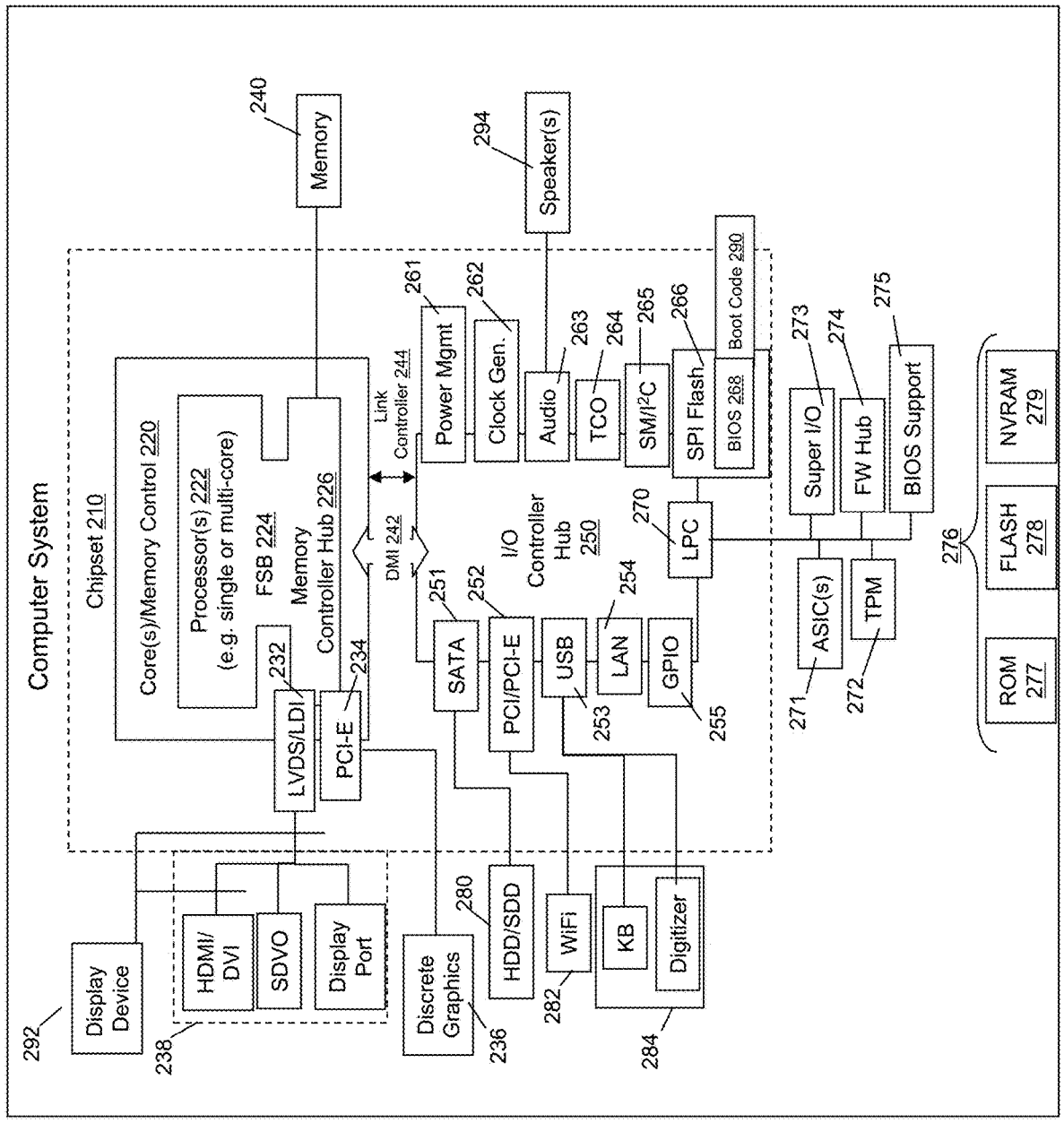
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric input/security devices, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or other electronic devices. Users may employ these devices for various functions, e.g., inputting handwriting strokes as an input modality to an Internet search application, an email application, a text messaging or instant messaging application, with fillable forms, etc. For example, the circuitry outlined in FIG. 1 may be implemented in a tablet or smart phone embodiment, whereas the circuitry outlined in FIG. 2 may be implemented in a laptop personal computer embodiment. In each case, the device may include an input and display device, e.g., a touch screen or the like, which acts to accept handwriting strokes and provides visual displays of input characters, conversions of handwritten characters or strokes to machine text, presentation of candidate, replacement or alternative words and the like.

Figure 3B:
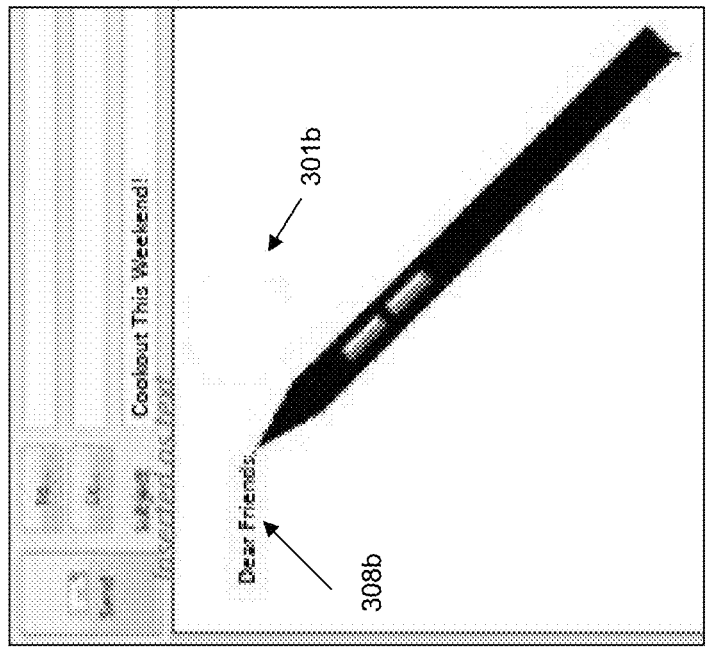
FIG. 3(A-B) an example handwriting preview window.
Figure 3A:
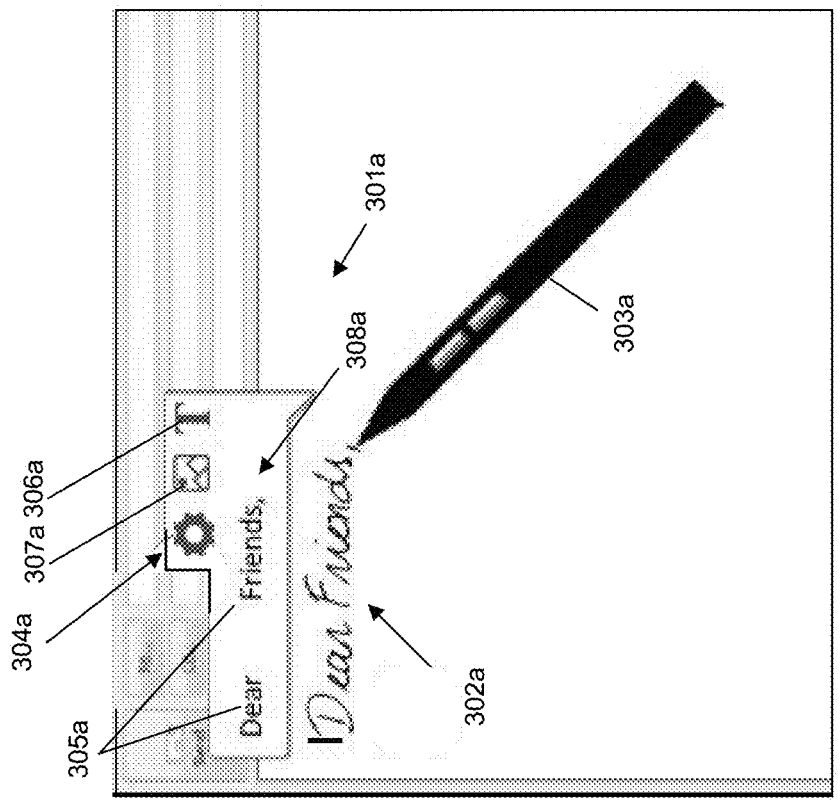

In FIG. 3(A-B) an example of providing an overlay input application is illustrated. The overlay input application is provided as an input method for an underlying application 301*a*, in this example an email application. The overlay input application converts handwriting inputs 302*a*, in this example "Dear Friends," into machine typeset 308*b*. In the overlay input application an input field overlies the underlying application's input field. In the example of FIG. 3(A-B), the overlay input field is provided directly on top of the underlying message body field of the email application. This provides a user with a visually co-located input modality such that the user may focus his or her concentration on the location of input.

The overlay input overlay application also includes a preview window or bubble 304*a* (herein simply area) that includes a sub-area presenting machine typeset 305*a* identified via a handwriting recognition process for the ink strokes 302*a*. This preview is provided such that the user is apprised of the result of the handwriting recognition process. In the illustrated example, typeset words "Dear" and "Friends," 305*a* are presented in the sub-area indicating that the handwriting recognition engine has accurately recognized the handwritten ink strokes 302*a* (provided in this example with a pen 303*a*) as the words "Dear" and "Friend, ". Had the handwriting recognition processing not identified characters or words, e.g., detected symbols, gestures, a drawing, etc., the preview area would not present typeset words 305*a* but rather may provide a preview of the recognized gesture, symbol, etc., or a default indication, e.g., " . . . " may be provided, as described herein.

The preview window or area 304*a* may also provide soft controls, such as a settings control, a graphic input control 307*a* and/or a typeset input control 306*a*. This permits the user to interface, e.g., with tip of pen 303*a*, to control the action(s) of the overlay input application. By way of example, a user may provide an input to the soft control 306*a* to enter the typeset previewed at 305*a* into the underlying application, e.g., as illustrated at 308*b* of FIG. 3B. Similarly, a graphic input of the ink strokes 302*a* may be input via interfacing with the graphics soft control 307*a*, e.g., with pen 303*a*. After the user input 302*a* has been provided to the underlying application 301*b*, the preview window or area may be taken away, as illustrated in FIG. 3B. This may be done after a predetermined time out, e.g., as configured by the user in the settings.

Illustrated in FIG. 4(A-B) is an example operation of a handwriting preview window. As shown in FIG. 4A, a preview window 404*a* may be displayed in a location determined by an area associated with current ink stroke input 402*a*. For example, the preview window 404*a* is presented in an area directly above a user's active ink stroke input 402*a*. The preview window 404*a* may move, as for example in FIG. 4A the preview window 404*a* has been moved to the right, e.g., following the user's current ink strokes 402*a*, as prior ink input has been converted to typeset 408*a* and provided to the underlying application's input field 401*a*, located directly below the overlay input field.

Additional controls may be provided within the preview window 404*a*. By way of non-limiting example, the typeset preview words displayed for the user (the result of handwriting recognition) may be analyzed, e.g., for spelling. In the example illustrated in FIG. 4A, the typeset preview word "hotdegs" 405*a* is visually distinguished for the user in the preview window 404*a* because of a detected spelling error. If the user interfaces with the preview window 404*b*, e.g., by touching a pen tip on the word 405*b*, an embodiment may provide a drop down list in another sub-area 409*b* of the preview area 404*b*, as illustrated in FIG. 4B. This permits a user to review and approve the typeset preview words, e.g., word 405*b*, prior to inputting the same as typeset (machine input) 408*b* in the underlying application. In this example, the user may select, e.g., with input via the pen, the correct word "hotdogs" from the sub-area 409*b*.

Figure 5:
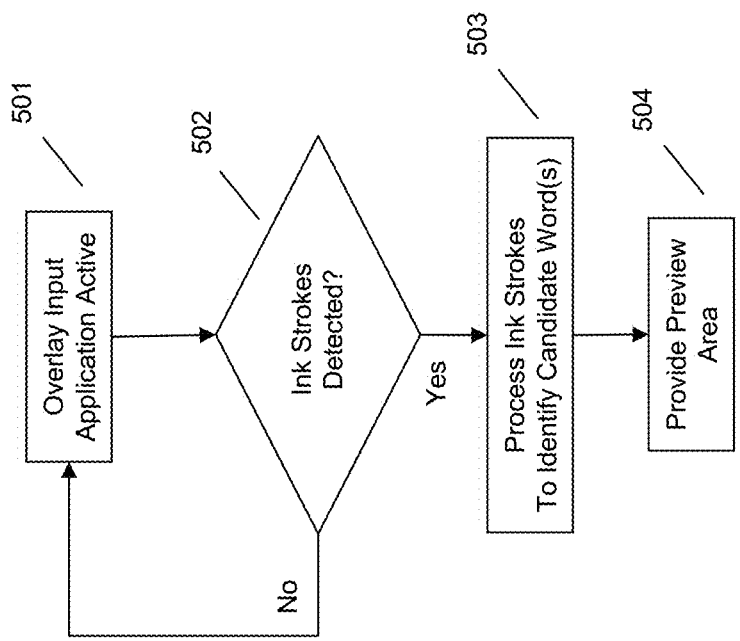
FIG. 5 illustrates an example method of providing a handwriting preview window.

An embodiment therefore provides a method in which, referring to FIG. 5, an active overlay input application 501 provides an input field overlay area for a corresponding input field of an underlying application (e.g., an email application as illustrated in FIG. 3(A-B) and FIG. 4(A-B)). This permits the overlay input application to detect at 502 one or more ink strokes are provided to the input field overlay. The ink strokes will be processed by a handwriting recognition engine at 503, e.g., using a technique akin to optical character recognition, such that machine input can be identified. For example, a handwriting recognition process may be used to detect input ink strokes (using a pen or finger tip) represent machine input characters.

Therefore, an embodiment provides at 504, e.g., in the overlay input application, a preview and, in one embodiment, a control area that displays a typeset preview for the one or more ink strokes and displays one or more soft controls. As illustrated in the non-limiting examples of FIG. 3(A-B) and FIG. 4(A-B), the preview and/or control area may be displayed in a location determined by an area associated with current ink stroke input. This precludes a user from needing to relocate their visual focus, e.g., down to the bottom of the screen. Moreover, an embodiment permits the location of the preview and/or control area to move in association with new ink stroke input provided by the user. As such, in-line review of the previewed typeset words is facilitated such that they may be processed by the input overlay application into machine input for insertion in the underlying application.

As described herein, the overlay input application may automatically input the one or more ink strokes to an underlying application as machine input, e.g., responsive to detection of one or more factors. By way of example, the overlay input application may input automatically a machine input for a first of n typeset preview words responsive to detection of the $n^{th}+1$ typeset preview word. Referring back to FIG. 4(A-B), for example, a preview and/or control area may be configured to buffer and display five typeset preview words such that on entry of a sixth ink stroke input, and handwriting recognition processing of the same, a new typeset preview word is provided in the preview and a first of the prior buffered typeset words is input into the underlying application. Thus, the word "get" in FIG. 4(A-B) may be removed from the preview area 404a, 404b on entry of an input following the ink stroke word "hamburgers." In addition, the ink strokes associated with the word "get" may be removed from the overlay input application area.

The overlay input application may automatically input a machine input responsive to a predetermined time out mechanism. For example, if the user removes the pen from the touch screen for a predetermined time, an embodiment may automatically input converted ink strokes into the underlying application. A user may indicate that the overlay input application should input a machine input responsive to a predetermined gesture input, e.g., a return gesture, placing the pen in another underlying input field, a new line in a multi-line input field, etc. Additional events may cause the overlay input application to automatically input a machine input, for example, an embodiment may detect that the stylus, finger, or other writing instrument is a predetermined distance from the screen.

An embodiment therefore represents a technical improvement in providing an overlay input application in which a user may enter ink strokes. This assists the user by more intelligently linking the visual display of the overlay input application input field and preview and control area(s) to the context of handwriting input. The various embodiments also provide for automated and semi-automated processing and control of ink stroke inputs, making the handwriting input modality more user friendly. Moreover, the various embodiments improve the handwriting input process by providing the user with the ability to review ink strokes and typeset previews of the same in-line, without needing to jump to different areas of a touch screen.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions that are executed by a processor and stored on a device readable storage medium, referred to herein as a non-signal storage device. A non-signal storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a non-signal storage device is not a signal, is non-transitory, and "non-transitory" includes all media except signal media.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a special purpose information handling device or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
providing an overlay input application for an input field of an underlying application, wherein the underlying application includes existing typeset text and wherein the overlay input application comprises an input field overlay area and a preview window;
detecting, in the input field overlay area of the overlay input application one or more ink strokes provided to the input field overlay area, wherein the one or more ink strokes are in line with the existing typeset text in the underlying application and wherein the one or more ink strokes form at least one handwritten word;
displaying, in the preview area, a typeset preview for the at least one handwritten word responsive to provision of the one or more ink strokes to the input field overlay area, wherein the preview area comprises at least one soft control button and visually distinguishes misspelled words in the typeset preview; and
automatically inputting the at least one handwritten word to the underlying application as machine input responsive to detecting the existence of one or more factors;
wherein the preview area is displayed in a location determined by an area associated with current ink stroke input;
wherein the overlay input application operates in conjunction with, but is independent and different from, the underlying application.

2. The method of claim 1, further comprising a control area, wherein the control area displays one or more soft controls; and
wherein the location of the preview area and control area move in association with new ink stroke input.

3. The method of claim 1, wherein the overlay input application automatically inputs, to the underlying application, a machine input for a first of n typeset preview words responsive to detection of an $n^{th}+1$ typeset preview word.

4. The method of claim 3, further comprising removing the first of n typeset preview words from the preview area responsive to detection of the $n^{th}+1$ typeset preview word.

5. The method of claim 3, further comprising removing the one or more ink strokes associated with the first of n typeset preview words.

6. The method of claim 1, wherein the overlay input application automatically inputs a machine input responsive to an event selected from the group consisting of: a predetermined time out mechanism and a predetermined gesture input.

7. The method of claim 1, wherein the overlay input application automatically inputs, to the underlying application, a machine input responsive to detecting one or more ink stroke inputs at a new location.

8. The method of claim 7, wherein the new location is selected from the group consisting of: a new line and a new underlying input field.

9. The method of claim 2, wherein the one or more soft controls is selected from the group consisting of: a typeset input control and a graphic input control.

10. An electronic device, comprising:
an input and display device;
a processor operatively coupled to the input and display device; and
a memory device that stores instructions executable by the processor to:
provide an overlay input application for an input field of an underlying application, wherein the underlying application includes existing typeset text and wherein the overlay input application comprises an input field overlay area and a preview window;
detect, in the input field overlay area of the overlay input application, one or more ink strokes provided to the input field overlay area, wherein the one or more ink strokes are in line with the existing typeset text in the underlying application and wherein the one or more ink strokes form at least one handwritten word;
display, in the preview area, a typeset preview for the at least one handwritten word responsive to provision of the one or more ink strokes to the input field overlay area, wherein the preview area comprises at least one soft control button and visually distinguishes misspelled words in the typeset preview; and
automatically input the at least one handwritten word to the underlying application as machine input responsive to detecting the existence of one or more factors;
wherein the preview area is displayed in a location determined by an area associated with current ink stroke input;
wherein the overlay input application operates in conjunction with, but is independent and different from, the underlying application.

11. The electronic device of claim 10, wherein the instructions are further executable by the processor to provide a control area, wherein the control area displays one or more soft controls; and
wherein the location of the preview area and control area move in association with new ink stroke input.

12. The electronic device of claim 10, wherein the overlay input application automatically inputs, to the underlying application, a machine input for a first of n typeset preview words responsive to detection of an $n^{th}+1$ typeset preview word.

13. The electronic device of claim 12, wherein the instructions are further executable by the processor to remove the first of n typeset preview words from the preview area responsive to the detection of the $n^{th}+1$ typeset preview word.

14. The electronic device of claim 12, wherein the instructions are further executable by the processor to remove the one or more ink strokes associated with the first of n typeset preview words.

15. The electronic device of claim 10, wherein the overlay input application automatically inputs a machine input responsive to and event selected from the group consisting of: a predetermined time out mechanism, a predetermined gesture input, and detecting an out of range status.

16. The electronic device of claim 10, wherein the overlay input application automatically inputs, to the underlying application, a machine input responsive to detecting one or more ink stroke inputs at a new location.

17. The electronic device of claim 16, wherein the new location is selected from the group consisting of a new line and a new underlying input field.

18. A product, comprising:
a non-signal storage device having code stored therewith, the code being executable by a processor of an electronic device and comprising:
code that provides an overlay input application for an input field of an underlying application, wherein the underlying application includes existing typeset text and wherein the overlay input application comprises an input field overlay area and a preview window;
code that detects, in the input field overlay area of the overlay input application, one or more ink strokes provided to the input field overlay area, wherein the one or more ink strokes are in line with the existing typeset text in the underlying application and wherein the one or more ink strokes form at least one handwritten word;
code that display, in the preview area, a typeset preview for the at least one handwritten word responsive to provision of the one or more ink strokes to the input field overlay area, wherein the preview area comprises at least one soft control button and visually distinguishes misspelled words in the typeset preview; and
code that automatically inputs the at least one handwritten word to the underlying application as machine input responsive to detecting the existence of one or more factors;
wherein the preview area is displayed in a location determined by an area associated with current ink stroke input;
wherein the overlay input application operates in conjunction with, but is independent and different from, the underlying application.

\* \* \* \* \*